United States Patent
Greverie et al.

(10) Patent No.: US 8,306,485 B2
(45) Date of Patent: Nov. 6, 2012

(54) DEVICE AND A METHOD FOR CONTROLLING AND MONITORING THE POWER OF THE SIGNAL FROM A RADIOCOMMUNICATIONS TERMINAL

(75) Inventors: Franck Greverie, Paris (FR); Jacques Muller, Jouy le Moutier (FR)

(73) Assignee: Z124, George Town, Grand Cayman (KY)

( * ) Notice: Subject to any disclaimer, the term of this patent is extended or adjusted under 35 U.S.C. 154(b) by 654 days.

(21) Appl. No.: 09/969,584

(22) Filed: Oct. 4, 2001

(65) Prior Publication Data
US 2002/0055338 A1    May 9, 2002

(30) Foreign Application Priority Data
Oct. 9, 2000  (FR) ...................................... 00 12875

(51) Int. Cl.
*H03C 1/52* (2006.01)

(52) U.S. Cl. .................. 455/107; 455/575.4; 455/575.7; 455/95; 455/129

(58) Field of Classification Search .................. 343/876; 455/522, 67.11, 73, 78, 82–88, 550.1, 115.3, 455/226.2, 277.1
See application file for complete search history.

(56) References Cited

U.S. PATENT DOCUMENTS

| 3,795,910 | A | * | 3/1974 | Robinson, Jr. ................... 342/82 |
| 5,541,609 | A | | 7/1996 | Stutzman et al. |
| 5,564,086 | A | * | 10/1996 | Cygan et al. ................... 455/126 |
| 5,777,530 | A | * | 7/1998 | Nakatuka ....................... 333/104 |
| 5,970,398 | A | * | 10/1999 | Tuttle .......................... 455/193.1 |
| 5,991,608 | A | | 11/1999 | Leyten |
| 6,721,368 | B1 | * | 4/2004 | Younis et al. ................. 375/295 |
| 6,735,418 | B1 | * | 5/2004 | MacNally et al. .............. 455/78 |

FOREIGN PATENT DOCUMENTS

| DE | 195 48 822 A1 | 7/1997 |
| EP | 0 508 567 A2 | 10/1992 |
| GB | 2 346 043 A | 7/2000 |

* cited by examiner

*Primary Examiner* — Dai A Phuong
(74) *Attorney, Agent, or Firm* — Marsh Fischmann & Breyfogle LLP; Daniel J. Sherwinter

(57) ABSTRACT

A radiocommunications terminal includes a send circuit and a receive circuit connected to a send/receive antenna of the terminal and respectively defining, when in operation, a send mode and a receive mode. The terminal also includes a circuit in a common part of the connection of the send and receive circuits to the antenna for matching the send and receive circuits to the antenna. A device for controlling and monitoring the power of signals sent/received by the terminal decenters the impedance matching of the antenna of the terminal only when the device is in send mode. Applications include reducing the energy impinging on the user of a mobile radio communications terminal.

9 Claims, 1 Drawing Sheet

DEVICE AND A METHOD FOR CONTROLLING AND MONITORING THE POWER OF THE SIGNAL FROM A RADIOCOMMUNICATIONS TERMINAL

CROSS-REFERENCE TO RELATED APPLICATIONS

This application is based on French Patent Application No. 00 12 875 filed Oct. 9, 2000, the disclosure of which is hereby incorporated by reference thereto in its entirety, and the priority of which is hereby claimed under 35 U.S.C. §119.

BACKGROUND OF THE INVENTION

1. Field of the Invention

The present invention relates to radiocommunications, especially mobile radiocommunications, such as radiotelephony, and more particularly to a device and a method for controlling and monitoring the power of the signal from a radiocommunications terminal.

2. Description of the Prior Art

When they are operating, radiocommunications terminals emit a certain quantity of energy due to the electromagnetic radiation produced by the antennas of the terminal when communicating with telecommunications network base stations.

During normal use of a terminal, that is to say when the terminal is near the head of the user, and not held away therefrom, as when using headsets known as "hands free kits", a certain quantity of energy, referred to as the specific absorption rate (SAR), impinges on the user. This quantity of energy, or near field density, is all the greater if the terminal is operating with the maximum power weighting, that is to say at 33 dBm (or 2 watts peak) according to the GSM standard.

For a given terminal design, the SAR is directly proportional to the efficiency of the antenna and to the transmitted power. The efficiency of the antenna cannot be reduced too much as this would degrade the performance of the terminal, in particular when receiving. It is therefore beneficial to vary the power of the terminal within limits set by the standard.

The patent EP 977 304 discloses a device and a method for monitoring the power emitted in certain directions by a terminal including a plurality of antennas by selectively activating or deactivating one or more antennas.

This type of device necessitates the use of a plurality of monodirectional antennas, which leads to high manufacturing costs and non-negligible complexity of implementation.

Moreover, the corresponding method includes a step of detecting human presence in the vicinity of the device whose reliability is somewhat doubtful given the operating constraints of the terminal.

Other prior art methods limit the radiation from the terminal during a maximum period in order to reduce the radiation absorption rate or the mismatching of the antenna and the transmit band.

However, these prior art methods compromise the efficiency of the terminal in operation and the mismatching of an antenna by the prior art method is irreversible. Such mismatches compromise the performance of the antenna when receiving.

Against this background, the present invention alleviates the drawbacks of the prior art by proposing a simple device and a simple method for reducing the quantity of energy impinging on the user of a radiocommunications terminal when sending without compromising its performance when receiving.

SUMMARY OF THE INVENTION

The invention proposes a device for controlling and monitoring the power of signals sent/received by a radiocommunications terminal including a send circuit and a receive circuit connected to a send/receive antenna of the terminal and respectively defining, when in operation, a send mode and a receive mode and a circuit in a common part of the connection of the send and receive circuits to the antenna for matching the send and receive circuits to the antenna, which device includes means for decentering the impedance matching of the antenna of the terminal that are activated only when the device is in send mode.

One particular embodiment of the device further includes power attenuator means that are activated when the device is in send mode.

The attenuator means advantageously operate only for the maximum power weighting.

The device further includes a switch adapted to control activation of the matching decentering means.

The decentering means are preferably between the matching circuit and the antenna of the terminal.

The invention also provides a radiocommunications terminal including a device in accordance with the invention and a method of controlling and monitoring the power of signals sent/received by a radiocommunications terminal including a send circuit and a receive circuit connected to a send/receive antenna of the terminal and respectively defining, when in operation, a send mode and a receive mode, and a circuit in a common part of the connection of the send and receive circuits to the antenna for matching the send and receive circuits to the antenna, the method including a step of decentering the impedance matching of the antenna of the terminal.

In one embodiment the impedance matching of the antenna is decentered between the matching circuit and the antenna of the terminal, only in send mode and only at the maximum power weighting.

The invention will become clearer in the light of the following description, which relates to a non-limiting embodiment of the invention and is given with reference to the accompanying drawing.

DETAILED DESCRIPTION OF THE PREFERRED EMBODIMENT

Figure 1:
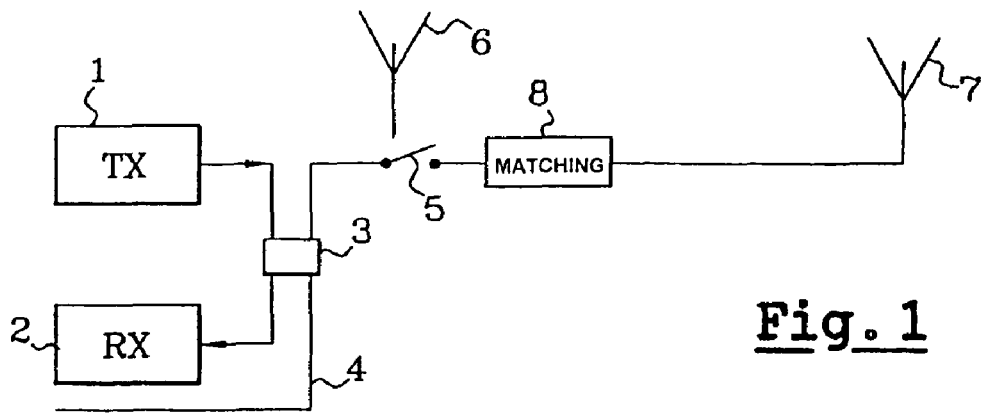
FIG. 1 is a partial and diagrammatic representation of the send and receive circuits of a prior art radiocommunications terminal.

FIG. 1 is a partial and diagrammatic representation of the send and receive circuits of a prior art radiocommunications terminal.

Figure 2:
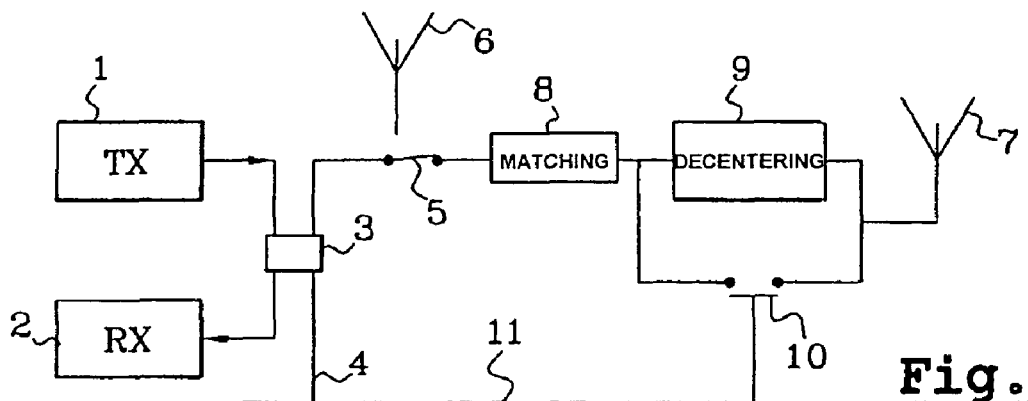
FIG. 2 is a diagrammatic representation of the device according to the invention in a send configuration.
Figure 3:
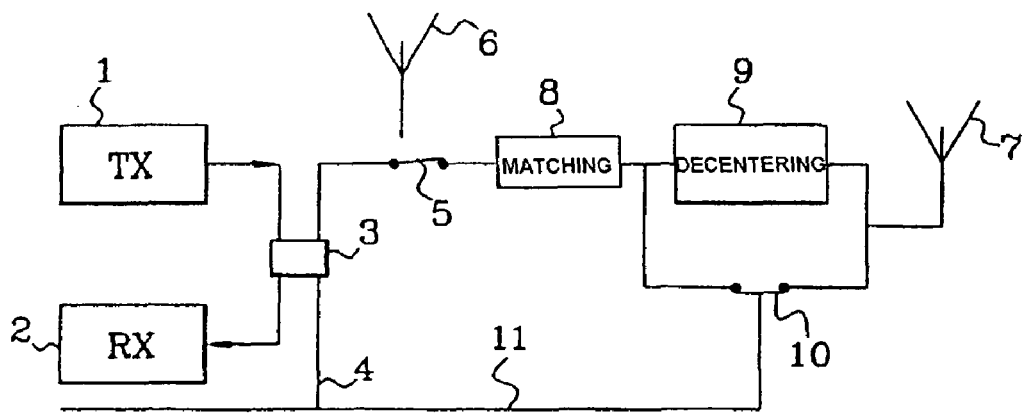
FIG. 3 is a diagrammatic representation of the device according to the invention in a receive configuration.

The radiocommunications terminal includes a prior art send circuit 1 and a prior art receive circuit 2, not shown in detail in FIGS. 1, 2 and 3.

The send circuit 1 and the receive circuit 2 are together connected to a prior art switch circuit 3. The switch circuit 3 is connected to a prior art digital radio card (not shown) of the radiocommunications terminal by a connection 4. It routes the signals and differentiates the uplink and downlink channels.

The switch circuit 3 is further connected to a mechanical switch 5 for connecting the send circuit 1 and the receive circuit 2 either to an external antenna 6 such as a vehicle roof-top antenna or the antenna 7 of the radiocommunications terminal.

It should be noted that the antenna 7 of the radiocommunications terminal can be a dipole antenna (quarter-wave antenna), a "patch" antenna, or any other type of antenna.

A matching circuit 8 between the mechanical switch 5 and the antenna 7 of the radiocommunications terminal matches the impedance of the antenna of the terminal 7. This is known in the art. A radiocommunications terminal antenna has reactive terms that the matching circuit eliminates to match the antenna to the source impedance.

FIG. 2 shows diagrammatically a device according to the invention for implementing the method according to the invention.

Components in FIG. 2 common to FIG. 1 are designated by the same reference numbers. The mechanical switch 5 is configured so that the antenna 7 of the terminal is active, the external antenna 6 being disconnected or absent.

Means for decentering the impedance matching of the antenna 7 of the terminal are included in the part of the circuit common to the send circuit 1 and the receive circuit 2, downstream of the mechanical switch 5.

The impedance matching of the antenna 7 of the terminal is decentered on the common line taken by the uplink and downlink channels at the output (in the uplink direction) of the switch circuit 3 differentiating between sending and receiving.

In one particular embodiment, the decentering means are connected in series between the matching circuit 8 and the antenna 7 of the terminal.

A switch 10 shunts the means 9 for decentering the impedance matching of the antenna 7 of the terminal. The switch 10 is connected to the digital radio card previously referred to (not shown) by a connection 11.

The switch 10 is controlled by the digital radio card and has two positions, one of which closes the circuit shunting the means 9 and the other of which opens that circuit, in accordance with information received from the digital radio card.

One particular embodiment of the device includes attenuator means in the form of an attenuator for deliberately introducing losses into the signal conveyed by the device. Because, for a given terminal design, and as already pointed out, the SAR depends on the power transmitted and on the efficiency of the antenna, attenuating the signal reduces the SAR.

There are various ways of making the attenuator, including the following two ways:
 a "fixed" solution having a Pi or T structure; and
 a "variable" solution, using an FET configured as a variable resistor.

The means 9 for decentering the impedance matching of the antenna 7 of the terminal can consist of means for centering the matching of the antenna to optimize its efficiency.

Recentering the resonant frequency of the antenna 7 of the terminal in the middle of the send/receive band gap degrades the efficiency of the antenna 7 of the terminal for sending without affecting the efficiency of the antenna for receiving.

The means for centering the matching of the antenna 7 of the terminal consist of a matching circuit having a Pi or T structure with a reactive component switched by means of a PIN diode, for example.

Whichever solution is adopted, the device according to the invention can be configured to limit modification of the signal so that it always remains within the values set by the recommendations of the standards.

In the FIG. 2 embodiment, the device according to the invention is shown during a sending phase.

The switch 10 is open and the means 9 for decentering the impedance matching of the antenna 7 of the terminal are therefore conducting and the signal to be transmitted by the terminal therefore passes through the matching circuit 8 and then the means 9 before reaching the antenna 7 of the terminal.

The means 9 for decentering the impedance matching of the antenna 7 of the terminal therefore provide the best compromise between the efficiency necessary for transmitting the signal via the antenna 7 of the terminal and the emitted near field density.

The device can advantageously be configured so that the means 9 for decentering the matching are active only when the terminal is operating at maximum power (or with the maximum power weighting, i.e. at 33 dBm according to the GSM standard), at which the SAR is maximum.

FIG. 3 shows diagrammatically the device according to the invention during a receiving phase.

The prior art digital radio card (not shown) controls the switch 10 via the connection 11 so that the switch closes the circuit shunting the means 9 for decentering the impedance matching of the antenna 7.

The signal received by the antenna 7 of the terminal therefore follows the portion of the circuit including the switch 10, without passing through the means 9. The received signal is therefore not modified in any way and reaches the reception circuit 2 via the switch circuit 3.

The device according to the invention, and in particular the means 9 for decentering the impedance matching of the antenna 7, can be configured at will, in particular with regard to their tripping threshold.

By modifying the power transmitted, the device according to the invention reduces the SAR when the radiocommunications terminal is sending a signal without affecting the efficiency of the antenna 7 of the terminal when receiving.

In a subsequent embodiment, not described, the device includes attenuator means and decentering means in accordance with the invention for degrading the transmission of the signal.

The invention claimed is:
1. A radio communications terminal comprising:
 an integrated antenna;
 an interface configured to couple with an external antenna;
 a transceiver having a transmit circuit and a receive circuit;
 a first switch configured to couple the transceiver with the external antenna in a first state and to couple the transceiver with the integrated antenna in a second state;
 a matching circuit coupled between the integrated antenna and the first switch and configured to impedance-match the transceiver with the integrated antenna when the first switch is in the second state;
 a decentering circuit coupled between the integrated antenna and the first switch and configured to decenter impedance matching between the matching circuit and the integrated antenna; and
 a second switch configured to activate the decentering circuit to decenter impedance matching between the matching circuit and the integrated antenna only during a transmission of a signal by the transmit circuit for a maximum power weighting so as to reduce near field density during the transmission from the integrated antenna when the first switch is in the second state.

2. The radio communications terminal of claim 1, further comprising an attenuator configured to reduce power of the signal being a transmitted by the transmit circuit.

3. The radio communications terminal of claim 2, wherein the attenuator is a power attenuator.

4. The radio communications terminal of claim 2 wherein the attenuator is only operable for a maximum power weighting.

5. The radio communications terminal of claim 1, wherein the decentering circuit is disposed between the matching circuit and the integrated antenna and is configured to change an apparent impedance of the integrated antenna from the perspective of the matching circuit.

6. A method of controlling and monitoring the power of signals implemented in a radio communications terminal, the method comprising:
   switching one of a transmission circuit or a receive circuit of the radio communications terminal from being connected with an external antenna to being connected with an integrated antenna;
   matching an apparent impedance of the integrated antenna with an apparent impedance of the connected one of the transmission circuit or the receive circuit to provide an impedance-matched signal using a matching circuit in response to the switching step; and
   a decentering circuit selectively decentering an impedance of the integrated antenna to adjust the apparent impedance of the integrated antenna according to which is the connected one of the transmission circuit or the receive circuit so as to reduce near field density during transmission of a signal by the transmission circuit by the decentering circuit controlling a signal switch to be:
   open when the integrated antenna is connected to the transmit circuit to allow the impedance-matched signal to pass through the decentering circuit; and
   closed when the integrated antenna is connected to the receive circuit, thereby shunting the decentering circuit when the integrated antenna is connected to the receive circuit.

7. The method of claim 6, wherein the decentering circuit is only operable for a maximum power weighting.

8. A radio communications terminal comprising:
   an integrated antenna;
   an interface configured to couple with an external antenna;
   a transmit circuit;
   a receive circuit;
   a first switch configured to couple the transmit circuit or the receive circuit with the external antenna in a first state and to couple the transmit circuit or the receive circuit with the integrated antenna in a second state;
   a second switch, coupled between the transmit and receive circuits and the integrated antenna, to connect one of the transmit or receive circuits to the integrated antenna at a time;
   a matching circuit configured to match the impedance of the integrated antenna to provide an impedance-matched signal;
   a decentering circuit configured to adjust the impedance of the integrated antenna as seen by the matching circuit; and
   a control unit configured to control a signal switch to control whether the impedance-matched signal is allowed to pass through the decentering circuit, so that:
   the signal switch is open when the integrated antenna is connected to the transmit circuit to allow the impedance-matched signal to pass through the decentering circuit; and
   the signal switch is closed when the integrated antenna is connected to the receive circuit to shunt the decentering circuit when the integrated antenna is connected to the receive circuit.

9. The radio communications terminal of claim 8, wherein the decentering step is only performed for a maximum power weighting.

* * * * *